United States Patent
Eder et al.

(10) Patent No.: US 9,238,434 B2
(45) Date of Patent: Jan. 19, 2016

(54) REAR VIEW MIRROR SIMULATION

(75) Inventors: Oliver Eder, Pinache (DE); Frank Linsenmaier, Weinstadt (DE)

(73) Assignees: SMR Patents S.a.r.l., Luxembourg (LU); Audi AG, Ingolstadt (DE)

( * ) Notice: Subject to any disclaimer, the term of this patent is extended or adjusted under 35 U.S.C. 154(b) by 261 days.

(21) Appl. No.: 13/090,127

(22) Filed: Apr. 19, 2011

(65) Prior Publication Data

US 2011/0254957 A1    Oct. 20, 2011

(30) Foreign Application Priority Data

Apr. 19, 2010 (EP) .................................... 10160325

(51) Int. Cl.
*H04N 7/18* (2006.01)
*G02B 5/08* (2006.01)
*B60R 1/00* (2006.01)
*G06T 3/00* (2006.01)
*H04N 5/357* (2011.01)

(52) U.S. Cl.
CPC ............... *B60R 1/00* (2013.01); *G06T 3/0018* (2013.01); *B60R 2300/105* (2013.01); *B60R 2300/207* (2013.01); *B60R 2300/8046* (2013.01); *H04N 5/3572* (2013.01)

(58) Field of Classification Search
None
See application file for complete search history.

(56) References Cited

U.S. PATENT DOCUMENTS

| | | | |
|---|---|---|---|
| 5,289,321 A * | 2/1994 | Secor | 359/896 |
| 5,445,294 A | 8/1995 | Gardner et al. | |
| 5,949,331 A | 9/1999 | Schofield et al. | |
| 2002/0171738 A1 | 11/2002 | Guan | |
| 2003/0085806 A1* | 5/2003 | Samman | B60R 1/00 340/435 |
| 2003/0128182 A1* | 7/2003 | Donath | B60R 1/00 345/156 |
| 2008/0159594 A1 | 7/2008 | Chiu et al. | |

FOREIGN PATENT DOCUMENTS

| | | | |
|---|---|---|---|
| DE | 10030359 | 6/2000 | |
| DE | 10043099 A1 | 3/2002 | |
| DE | 102008031784 | 4/2009 | |
| DE | 102008035429 | 4/2009 | |
| DE | 102008035429 A1 * | 4/2009 | ............ B60R 1/00 |
| DE | 102007054342 B3 | 6/2009 | |
| EP | 2000071877 | 7/2000 | |
| WO | 03051671 | 6/2003 | |
| WO | 2008050022 A2 | 5/2008 | |
| WO | 2009043783 | 4/2009 | |

OTHER PUBLICATIONS

European Search Report for application No. EP 10 16 0325 dated Oct. 6, 2010.

* cited by examiner

*Primary Examiner* — Andy Rao
*Assistant Examiner* — Tyler Edwards
(74) *Attorney, Agent, or Firm* — Reising Ethington PC (57) ABSTRACT

The invention relates to an exterior mirror simulation with image data recording and a display of the recorded and improved data for the driver of a motor vehicle. The display on a display device shows the data in a way chosen by the driver or the vehicle manufacturer.

16 Claims, 6 Drawing Sheets

REAR VIEW MIRROR SIMULATION

The invention is based on a priority patent application EP 10160325.6 which is hereby incorporated by reference.

BACKGROUND ART

1. Field of the Invention

The invention relates to an exterior mirror simulation with image data recording and a display of the recorded and improved data for the driver of a vehicle.

The display on a display device shows the data in a way favored by the driver and/or vehicle manufacturer.

2. Description of the Related Art

Several solutions for recording image data and its display for the driver of a vehicle are known in the prior art. The image recording is done by one or several cameras installed in the vehicle. The different assistance systems process the data from the captured image in very different ways.

In US patent application having publication number 2008/0159594, a system is known which records images from the surroundings of the vehicle with a fish-eye lens. Image data is recorded with great distortion through this wide-angle lens. The image data recorded by the camera pixels are rectified block by block. The display of the image is done with the rectified image data, since an image of the surroundings of the vehicle is required.

A camera for assisting reversing is known in DE 102008031784. The distorted camera image is edited and rectified, which leads to an undistorted image. This is then further processed, in order to optimise the perspective for reversing.

SUMMARY OF THE INVENTION

In contrast, the object of the invention is to create a display of a camera image, which corresponds to the familiar image in a rear view mirror. The distortions of the image caused by the different mirror glasses are provided for the driver in the usual manner.

The present invention relates to image rectification for a vehicle, which comprises a display device, in order to show modified images and a screen for receiving the recorded images, which have been improved by image rectification. Furthermore, the system comprises image rectification in communication with the display device and the screen, so that pixels, which are located in the recorded images, are improved by reorientation or repositioning of the pixels from a first position to a second position using a transmission or transfer process.

Furthermore, the invention relates to a rear view image improvement system for a vehicle, which includes a display device for showing modified images, which have been improved by the image improvement system, and a screen for receiving recorded images, which have been improved by the image improvement system. The system also comprises an image improvement module in connection with the display device, and indeed in such a way that pixels, which are located in the recorded images, are grouped and spread out, in order to form at least one region of interest, in which reference is made to the pixels from a base plane in the recorded image, in order to form the modified images.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
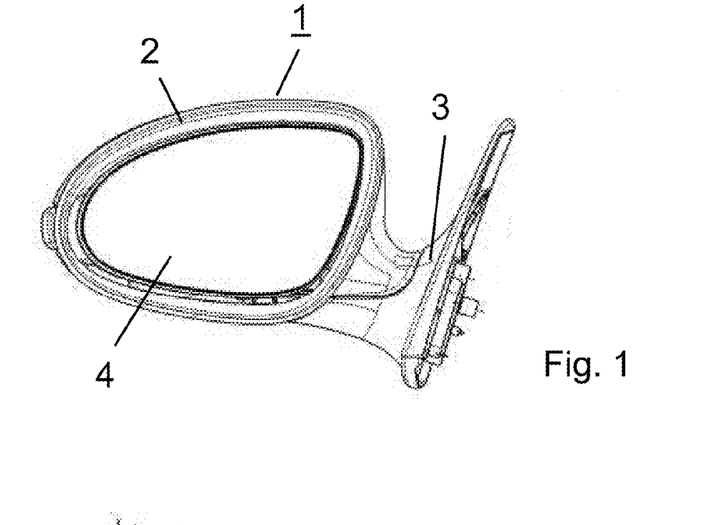
FIG. 1 shows an exemplary exterior mirror.

FIG. 1 shows an exterior mirror 1, which comprises a mirror head 2, which is connected to a vehicle by a mirror base or bracket 3. The mirror head 2 forms an opening for a mirror glass 4.

The size of the mirror glass 4 is determined by the mounting on the vehicle, as well as by the different legal regulations about the available field of view. In this process, different glass types for different regions have developed. In the USA, a flat plane glass is used on the driver side. A mirror of this type and the cut through this are shown in FIG. 2B. The example also contains an additional mirror 5, which is mounted onto the mirror in the form of a convex additional lens. This additional lens 5 provides the driver with a much distorted picture, but gives a wider angle of view for indentifying dangers. The additional lens is therefore built in many different ways, used on the front or rear side of the mirror glass, or omitted. This additional lens 5 is often referred to as a spot mirror or a blind spot mirror.

Figure 2A:
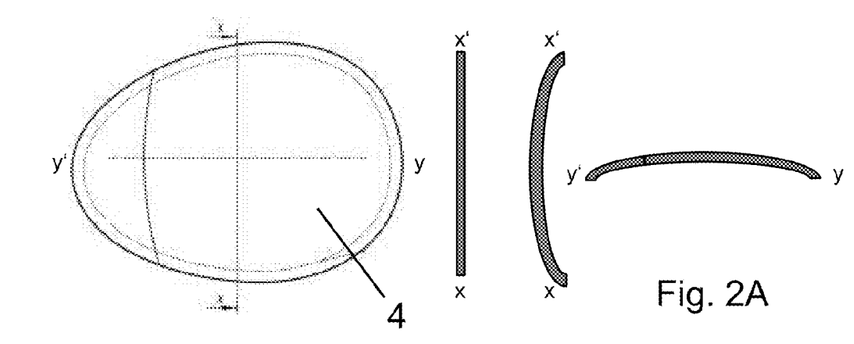
FIG. 2 shows examples of different mirror types.
Figure 2B:
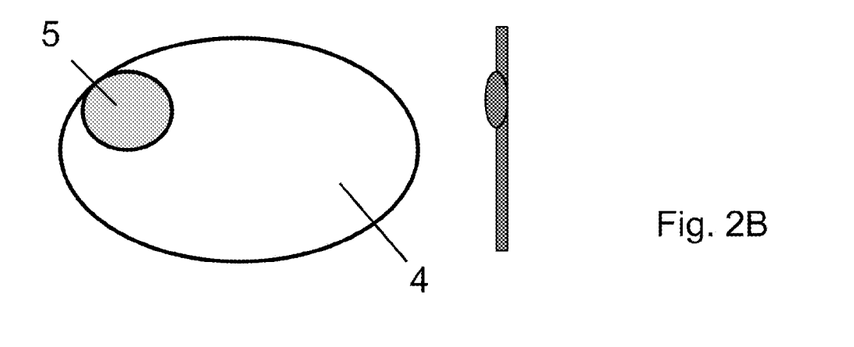

A mirror glass 4 with a curvature radius is shown in FIG. 2A. The glass in FIG. 2A can be used in mirror assemblies on the passenger side of the vehicle and on the driver side of the vehicle in countries other than the USA. Convex mirror glasses as well as glass with an aspherical part are used in addition to convex glass.

The driver of a vehicle is used to the display of each type of exterior mirror, and therefore can deduce for himself the warning information which he needs to steer the vehicle through the traffic.

Exterior mirrors contribute to the overall wind resistance of the vehicle. The aerodynamics of a vehicle are influenced by the exterior mirror. Therefore, it is sensible to replace it with the camera system that provides the same field of view while reducing the adverse affect on aerodynamics, and so to minimise the total $CO_2$ emissions of the vehicle, by reducing the turbulent flows around the vehicle, and creating a predominantly laminar flow.

Figure 3:
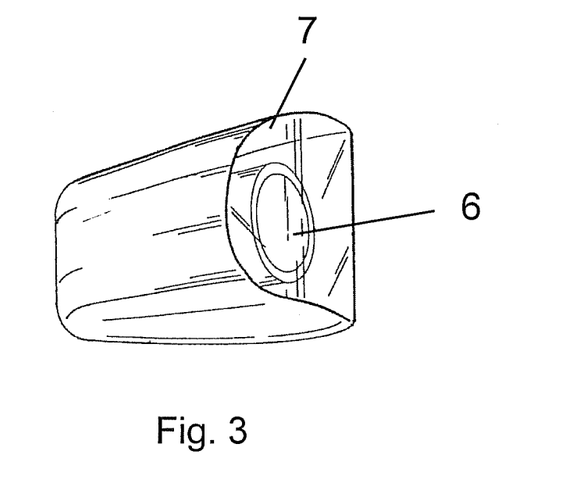
FIG. 3 shows a camera installation.

FIG. 3 shows a possible installation of a rear view assembly, generally indicated at 10 in a vehicle. The optical sensor 6, of which only the optic lens can be seen in the figure, is enclosed in a housing 7. The housing 7 is tightly mounted to a vehicle 8, best seen in FIG. 4. The housing 7 has a form which is streamlined on the vehicle 8. The optical sensor itself is installed in the housing 7, and has a watertight seal against weather effects, as well as against the influence of washing processes with detergents, solvents and high pressure cleaners.

Figure 4:
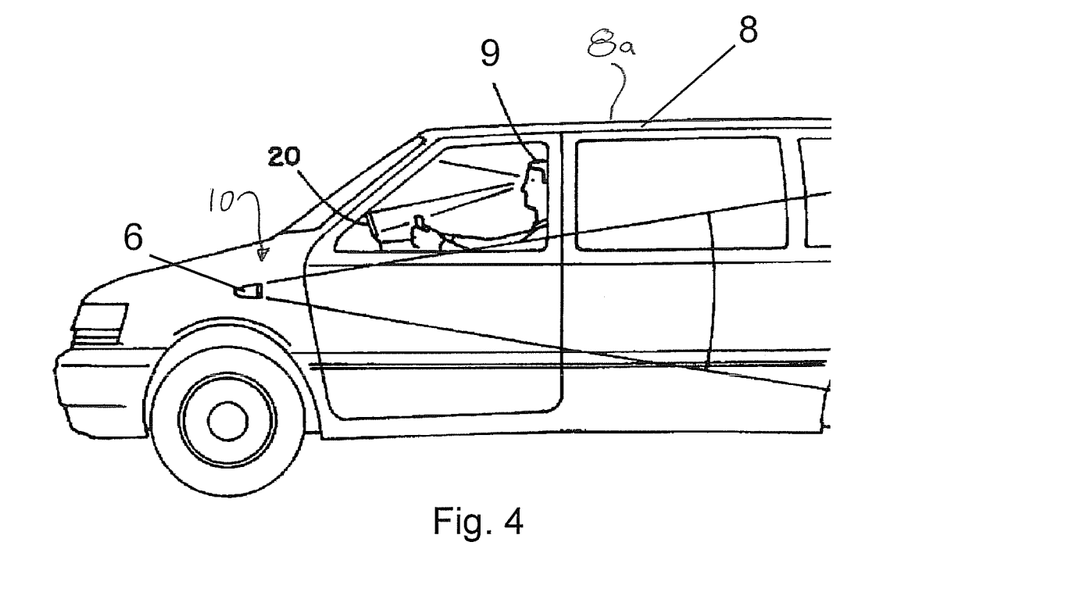
FIG. 4 shows an exemplary vehicle.

The housing 7 comprises an opening, through which the camera cabling is led. In this process, the connection of the camera to the electric system of the vehicle 8 is done by any bus system or a separate cable connection. FIG. 4 shows as an example the attachment position of a sensor in the housing 7 on the vehicle 8. The camera position is therefore to be chosen in a way that fulfils the legally required field of view. The position can therefore be on the front mudguard, on the mirror triangle or on the edge of the vehicle roof 8a. Through the application of a wide-angle lens, it is possible that the field of view of the sensor will larger than through a conventional mirror.

A display device 20, which can be seen by the driver 9, is mounted into a vehicle 8. The picture from the camera is transmitted to the display device 20. In one embodiment, the display device 20 is mounted to an A-pillar 21 of the motor vehicle 8.

Figure 5:
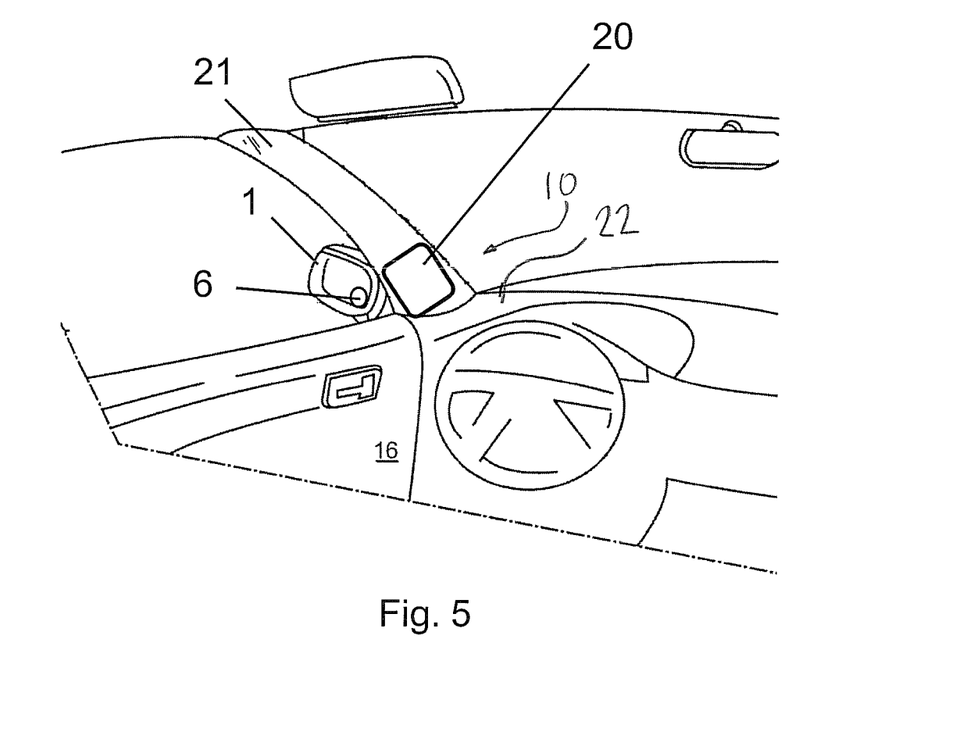
FIG. 5 shows a display in the vehicle.

FIG. 5 shows an exemplary embodiment of the present invention 10 with a display device 20, which is provided in the vehicle cab or vehicle interior for observation or viewing by the driver 9. The rear view assembly 10 delivers real-time wide-angle video images to the driver 9 that are captured and converted to electrical signals by the optical sensor 6. The optical sensor 6 is, for example, a sensor technology with a Charge-Coupled Device ('CCD') or a Complementary Metal Oxide Semiconductor ('CMOS'), for recording continuous real-time images. In FIG. 5, the display device 20 is attached to the A-pillar 21, so that the familiar look in the rear view mirror is led to a position which is similar to the familiar position of the exterior mirror used up to now.

In the event of mounting on the A-pillar 21 being difficult due to the airbag safety system, a position on the dashboard 22 near to the mirror triangle or the A pillar is also an option. The display device 20 shows the real-time images of camera 6, as they are recorded in this example by a camera 6 in the exterior mirror 1, as is shown in FIG. 5.

The invention is not dependent on whether the exterior mirror is completely replaced, or if, as is shown in FIG. 5, it 1 is still available as additional information. The optical sensor 6 can look through a semitransparent mirror glass.

Figure 6:
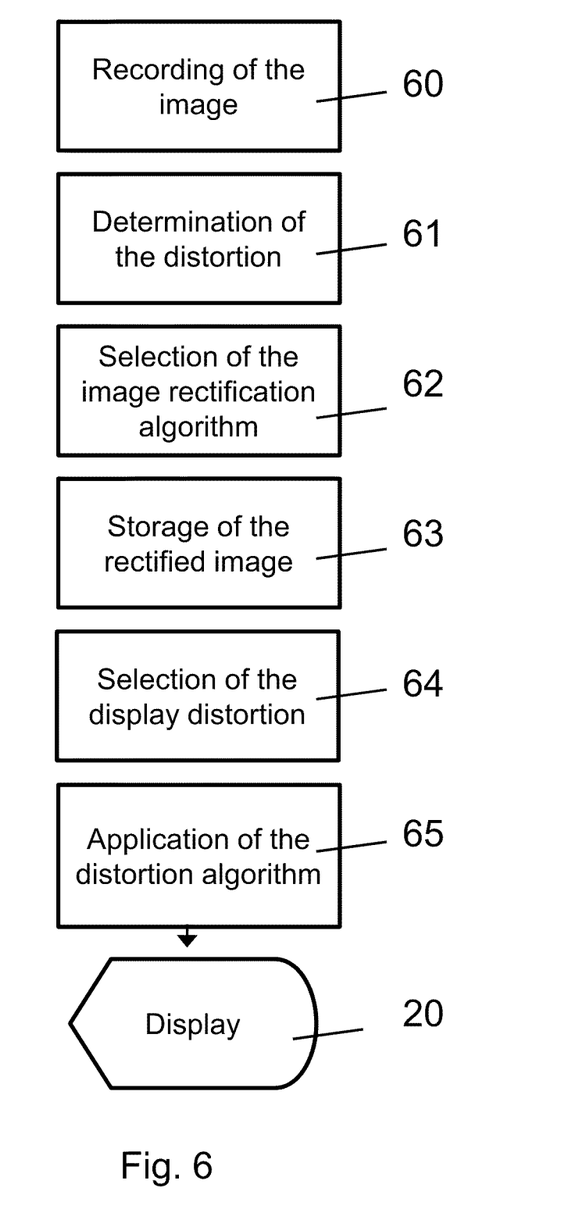
FIG. 6 shows the process of image capture.

The field of view recorded by an optical sensor 6 is processed and improved in an image rectification module, which is associated with the rear view assembly 10, according to the control process shown in FIG. 6. The image rectification module uses a part of the vehicle 8 as a reference (e.g. a part of the vehicle contour) when it modifies the continuous images, which are transmitted to the display device 20 as video data. The display device 20 can be a monitor, a liquid crystal display device or a TFT display, or LCD, a navigation screen or other known video display devices, which in the present invention permit the driver 9 to see the area near to the vehicle 8. The application of OLED, holographic or laser projection displays, which are adapted to the contour of the dashboard or the A pillar 21, are also useful.

The image rectification occurs onboard the vehicle 8, and comprises processing capacities, which are carried out by a computation unit, such as, for example, a digital signal processor or DSP, a field programmable gate array ('FPGA'), microprocessors or circuits specific to use, or application specific integrated circuits ('ASIC'), or a combination thereof, which show programmability, for example, by a computer-readable medium such as, for example, software or hardware, which is recorded in a microprocessor, including Read Only Memory ('ROM'), or as binary image data, which can be programmed by a user. The image rectification can be formed integrally with the imaging means 20 or the display device 14, or can be positioned away in communication (wired or wireless) with both the imaging means as well as the display device.

The initiation or starting up of the image rectification occurs when the driver starts the vehicle. At least one display device 20 displays continuous images from the side of the vehicle, and transmits the continuous images to the image rectification device. The image rectification device modifies the continuous images and transmits the improved images by video data to the display device 20, in order to help the driver.

The individual steps of image rectification as well as image distortion are shown in FIG. 6. In this process, the invention distorts the image of the wide-angle camera and applies post-distortion to this image, in order to give this image the same view as that of the desired mirror glass.

The first step is the recording of the image. In a second step, the type of distortion, to which the image is subjected, is determined.

In a further step, the algorithm is selected, which is adapted to the present distortion. An example is explained in DE 102008031784.

An optical distortion correction is an improving function, which is applied to the continuous images. The optical distortion correction facilitates the removal of a perspective effect and a visual distortion, which is caused by a wide angle lens used in the camera 6. The optical distortion correction uses a mathematical model of the distortion, in order to determine the correct position of the pixels, which are recorded in the continuous images. The mathematical position also corrects the pixel position of the continuous images, as a result of the differences between the width and height of a pixel unit due to the aspect or side ratio, which is created by the wide angle lens.

For certain lenses, which are used by the camera 6, the distortion co-efficient values k1 and k2 can be predetermined, in order to help in eliminating the barrel distortion, which is created by the use of a wide angle lens. The distortion co-efficient values are used for the real-time correction of the continuous images.

The distortion co-efficient values k1 and k2 can be further adjusted or coordinated by using an image, which is recorded in the continuous images, which shows the known straight line, for example, the lane markings on a road. According to this aspect of the present invention, the distortion center is registered by analysis of the recorded continuous images in the search for the straightest horizontal and vertical lines, whereby the center is situated where the two lines intersect. The recorded image can then be corrected with varied or fine-tuned distortion co-efficient values k1 and k2 in a trial and error process. If, for example, the lines on one side of the image are "barrel distorted" ("barreled") and lines on the other side of the image are "pin cushion distorted" ("pin-cushioned"), then the center offset must move in the direction of the pin-cushioned side. If a value is found, which sufficiently corrects the distortion, then the values for the distortion center 42 and the distortion coefficient values k1 and k2 can be used in the mathematical model of optical distortion correction.

Figure 7:
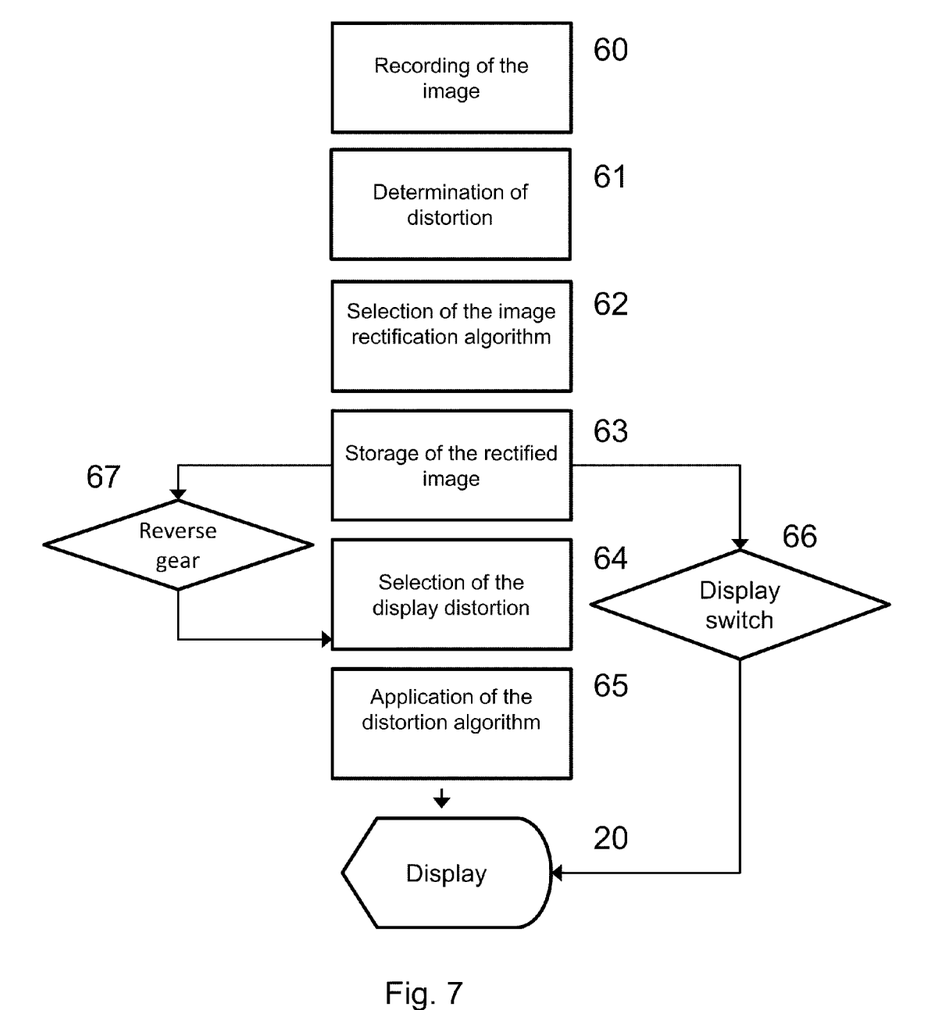
FIG. 7 shows an alternative process.
Figure 8:
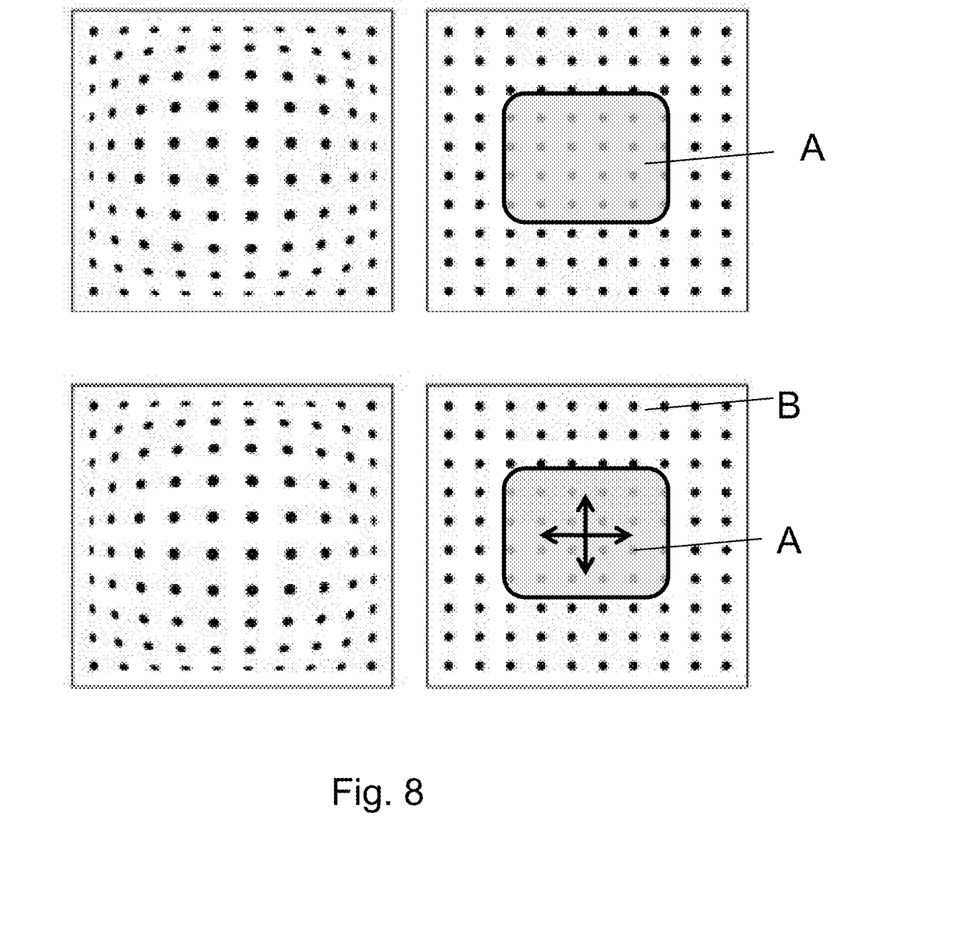
FIG. 8 shows distorted and rectified pixel areas.

As a result of the rectification stage at 63, a low-error image is given at 64, which can be shown on the display device 20. The image obtained after rectification corresponds to the image of a plane mirror, whereby the simulated mirror surface would be larger than the usual mirror surface. If such a plane mirror is simulated, the further steps are eliminated and the data is displayed directly on the display according to FIG. 7. The image of a plane mirror is defined by a selection of pixels of the optical sensor. In this way, as shown in FIG. 8, only the pixels in the middle of the optical sensor are chosen. In order to simulate the plane mirror in a larger approximation on the hardware mirror, data must be cut, and the section is limited to a section in the middle of the image.

The operator which is applied to the pixels in order to achieve the desired image is determined in the next step 64. For example, the algorithm is selected in order to again distort the low-error image as would be shown in mirror glass with an aspheric curve, for example. Therefore, the pixel values must be moved in a certain area in order to obtain the impression of curved mirror glass.

In the next step 65, the post-distortion of the present image is carried out. For example, a plane mirror with a convex additional mirror is chosen according to FIG. 2B. For this purpose, a defined number of pixels is chosen for the display of the plane mirror surface. In FIG. 8, it is area A which shows plane surfaces in the middle of the optical sensor. For the display of information from the convex additional lens, all pixels of the sensor must be used, both area A as well as B, in order to provide data to the wide-angle representation of the image, which is situated in a defined area of the display. This is due to the fact that the additional convex mirror will produce an image of which a portion overlaps the image that is created by the plane mirror.

The information from all pixels is subject to a transformation, and the image of all pixels is distorted and shown on a small area of the display. In this process, information is collated by suitable operators in order to optimally display the image on a lower number of display pixels.

All operations described up to now present a defined image while the vehicle is in motion. The image is adjusted depending on the application of the vehicle.

A further adjustment possibility of the simulated exterior mirror is the function of adapting the field of view to the driver's position. As in a conventional mirror, which is adapted by an electric drive to the perspective of the driver, the 'mirror adjustment' of the plane mirror simulation is done by moving section A on the optical sensor, so that other pixels of the optical sensors are visualised. The number of pixels, and therefore the size of the section, is not changed. This adjustment is indicated by the arrows in FIG. 8.

For a convex mirror, the adjustment to the perspective of the driver is not connected with simply moving a pixel section, but rather with a recalculation of the image.

In addition to the normal adjustment to the driver, a function is possible which offers an image with a larger field of view when reversing, which also includes the area around the rear wheel of the vehicle, if necessary.

If the driver goes into reverse, the image of the optical sensor is displayed in another way, namely in an enlarged rear view. On detection of reversing, the function, which generates an image of the rear wheel as well as the surrounding surface, is called in the selector switch 67.

If a forward gear is then selected, the display automatically changes back to the pre-determined display mode.

The whole control of the exterior mirror simulation is done by control elements, which are used in the conventional way on the vehicle door or on the dashboard. The default and definition of the mirror function is chosen by the vehicle manufacturer and is protected from manipulations by the driver. The vehicles must be delivered with these defaults in the respective areas.

This default can be changed, however not by the user himself, so that the security of the display is not affected.

The calibration of the image capture to the individual vehicle is also important in factory-set defaults. Before the setting for the desired type of exterior mirror is carried out, the image is optimally set. This has the advantage that the positioning of the optical sensors must not be carried out with the highest accuracy. The production process on the assembly line of the vehicle manufacturer therefore made easier. The calibration is done by software and not by the spatial setting of the sensor position.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We Claim:

1. A method for exterior mirror simulation, for a motor vehicle having a reverse view switch and driven by a driver, whereby an image of a wide-angle lens having a field of view is recorded, and information collected by pixels of an optical sensor undergoes the following steps:
  recording of the image;
  determining distortion created by the wide-angle lens;
  removing the distortion from the image;
  selecting an image rectification algorithm;
  applying the image rectification algorithm to subset of the total pixels in the image to create a rectified image;
  storing the rectified image;
  modifying the rectified image to a distorted rectified image representing the rectified image as viewed through a non-planar mirror only based on visible light information provided by the optical sensor;
  displaying the distorted rectified image on a display;
  adjusting the display device to an extended display when the motor vehicle is reversing to display more the distorted rectified image; and
  enlarging the field of view in the display when the motor vehicle is being reversed.

2. A method as set forth in claim 1 including calculating the field of view of the driver prior to the step of applying the rectification algorithm.

3. A method as set forth in claim 1 wherein the display is pre-calibrated.

4. A method as set forth in claim 3 wherein the display is pre-calibrated to a type of mirror to be simulated.

5. A method as set forth in claim 1 including a step of adjusting the image on the display by selecting a subset of pixels in the display differing from those in the image.

6. A method as set forth in claim 1 wherein the step of applying the image rectification algorithm to subset of the total pixels in the image to create a rectified image includes the step of capturing a portion of the motor vehicle in the image to use as a reference for rectification.

7. A rear view assembly for a motor vehicle, said rear view assembly comprising:
  a housing fixedly secured to the motor vehicle, said housing including an optical sensor housed therewith and a lens focusing light for said optical sensor to capture a wide-angle image, said optical sensor creating electrical signal representative of the focused light;
  a display device operatively connected to said optical sensor for receiving said electrical signal and for displaying the electrical signal as a rear view image for a driver of the motor vehicle such that said rear view image includes distortions created by said lens;
  a computational unit to identify and remove the image distortions created by said lens, said computational unit including a distortion simulator to distort the display of the rear view image only based on visible light information provided by said optical sensor to create a distorted display image such that the distorted display image appears to be created by a non-planar mirror; and
  a reverse view switch to adjust said display device to an extended display after the image distortions have been removed from the rear view image and the display distortions have been added to the rear view image to create an extended distorted display image when the motor vehicle is and enlarging the field of view in the display when the motor vehicle is being reversed.

8. A rear view assembly as set forth in claim 7 wherein the distorted display image on said display device simulates a convex exterior mirror.

9. A rear view assembly as set forth in claim 7 wherein the distorted display image on said display device simulates an aspherical exterior mirror.

10. A rear view assembly as set forth in claim 7 wherein the distorted display image on said display device simulates an exterior mirror with additional lens.

11. A rear view assembly as set forth in claim 7 wherein the distorted display image on said display device simulates an adjustment of the view for the driver.

12. A method for exterior mirror simulation, for a motor vehicle having a reverse view switch and driven by a driver, whereby an image of a wide-angle lens having a field of view is recorded, and information collected by pixels of an optical sensor undergoes the following steps:
   recording of the image;
   determining distortion created by the wide-angle lens;
   removing the distortion from the image;
   selecting an image rectification algorithm;
   applying the image rectification algorithm to subset of the total pixels in the image to create a rectified image;
   storing the rectified image;
   modifying the rectified image to a distorted rectified image representing the rectified image as viewed through a non-planar mirror only based on visible light information provided by the optical sensor;
   displaying the distorted rectified image on a display; and
   enlarging the field of view in the display when the motor vehicle is being reversed.

13. A method as set forth in claim 12 including calculating the field of view of the driver prior to the step of applying the rectification algorithm.

14. A method as set forth in claim 12 wherein the display is pre-calibrated.

15. A method as set forth in claim 12 wherein the display is pre-calibrated to a type of mirror to be simulated.

16. A method as set forth in claim 12 including a step of adjusting the image on the display by selecting a subset of pixels in the display differing from those in the image.

* * * * *